United States Patent
Liu et al.

(10) Patent No.: US 10,978,788 B2
(45) Date of Patent: Apr. 13, 2021

(54) ANTENNA SYSTEM FOR MOBILE TERMINAL AND MOBILE TERMINAL

(71) Applicant: AAC Technologies Pte. Ltd., Singapore (SG)

(72) Inventors: Mao Liu, Shenzhen (CN); Shengjun Liu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/702,544

(22) Filed: Dec. 4, 2019

(65) Prior Publication Data
US 2020/0212541 A1 Jul. 2, 2020

(30) Foreign Application Priority Data
Dec. 28, 2018 (CN) .......................... 201811628319.3

(51) Int. Cl.
| | |
|---|---|
| *H04M 1/00* | (2006.01) |
| *H01Q 1/24* | (2006.01) |
| *H01Q 5/307* | (2015.01) |
| *H04M 1/02* | (2006.01) |
| *H04W 88/06* | (2009.01) |

(52) U.S. Cl.
CPC ............. *H01Q 1/243* (2013.01); *H01Q 5/307* (2015.01); *H04M 1/026* (2013.01); *H04W 88/06* (2013.01)

(58) Field of Classification Search
CPC ........ H01Q 1/243; H01Q 21/28; H01Q 21/24; H01Q 9/0407; H01Q 21/065; H01Q 1/521; H01Q 13/10; H01Q 5/307; H01Q 21/29; H01Q 25/00; H01Q 13/206; H01Q 1/1214; H01Q 9/065; H01Q 9/27; H04W 88/06; H04M 1/026
See application file for complete search history.

(56) References Cited

U.S. PATENT DOCUMENTS

| | | | |
|---|---|---|---|
| 2019/0334226 A1* | 10/2019 | Zhao | H01Q 5/307 |
| 2020/0083948 A1* | 3/2020 | Lim | H01Q 3/2605 |
| 2020/0106186 A1* | 4/2020 | Cohen | H01Q 15/0093 |

FOREIGN PATENT DOCUMENTS

| | | |
|---|---|---|
| CN | 206271859 B1 | 6/2017 |
| CN | 108321498 A1 | 7/2018 |

OTHER PUBLICATIONS

PCT search report dated Jan. 23, 2020 by Sipo in related PCT Patent Application No. PCT/CN2019/113341 (8 Pages).

* cited by examiner

*Primary Examiner* — Nhan T Le
(74) *Attorney, Agent, or Firm* — W&G Law Group LLP

(57) ABSTRACT

An antenna system for a mobile terminal and a mobile terminal are provided. The antenna system includes a first antenna group, a second antenna group and a third antenna group distributed on a housing, where the first antenna group includes a plurality of first antennas, the second antenna group includes a plurality of second antennas, the third antenna group includes a plurality of third antennas, the first antennas operates at a 4G band, the second antennas operates at a Sub 6G band, and the third antennas operates at a 5G millimeter-wave band. According to the antenna system of the present disclosure, the mobile terminal applying the antenna system can realize 4G and 5G mobile communications at the same time, and have multiple signal transmission modes and improve the signal transmission efficiency.

14 Claims, 1 Drawing Sheet

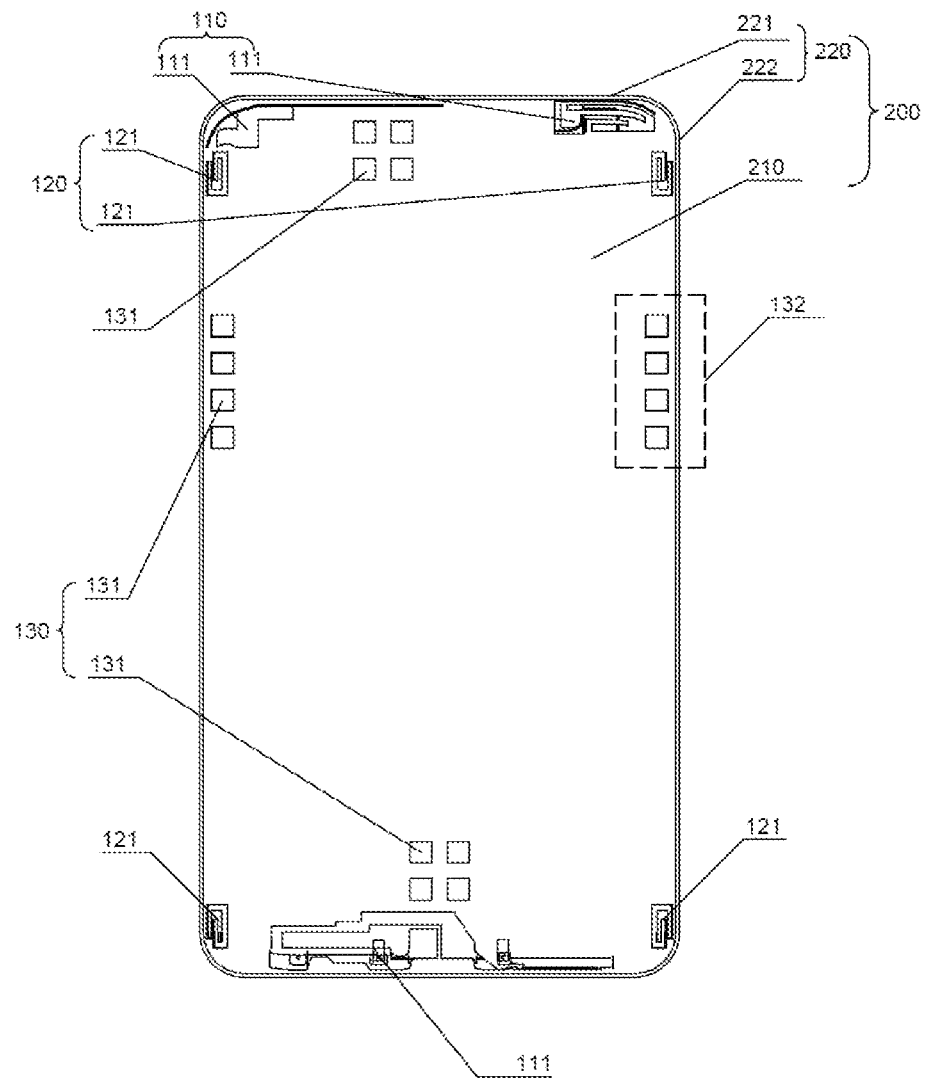

ANTENNA SYSTEM FOR MOBILE TERMINAL AND MOBILE TERMINAL

TECHNICAL FIELD

The present disclosure relates to antenna structure technologies of mobile terminals, and more particularly, to an antenna system for a mobile terminal, and a mobile terminal.

BACKGROUND

Mobile terminals (such as mobile phones, tablets and computers) include a housing and an antenna mounted on the housing. With the development of 5G mobile communication, the antenna in the mobile terminals will carry more and more frequency bands.

How to reasonably configure the number and layout of the antenna in a compact mobile terminal environment will be the key to antenna design in the mobile terminals.

The present disclosure is intended to provide an antenna system to solve the above-mentioned problems.

BRIEF DESCRIPTION OF THE DRAWINGS

FIG. 1 is a schematic layout diagram of an antenna system in the present disclosure.

DETAILED DESCRIPTION

The present disclosure will be further described hereinafter in detail with reference to FIG. 1.

A first aspect of the present disclosure relates to an antenna system for a mobile terminal. The mobile terminal may be, for example, a mobile phone, a computer or a tablet, etc. As shown in FIG. 1, the mobile terminal includes a housing 200, and the antenna system 100 includes a first antenna group 110, a second antenna group 120 and a third antenna group 130. The first antenna group 110 includes a plurality of first antennas 111, the second antenna group 120 includes a plurality of second antennas 121, and the third antenna group 130 includes a plurality of third antennas 131. Moreover, the first antennas 111, the second antennas 121 and the third antennas 131 operate at different bands.

Specifically, the operating bands of the antennas in each antenna group may be determined according to actual needs. For example, the first antennas 111 may operate at a 4G band, the second antennas 121 may operate at a Sub 6G band, and the third antennas 131 may operate at a 5G millimeter-wave band. Of course, the operating bands of the first antennas 111, the second antennas 121 and the third antennas 131 may be interchanged or changed into other operating bands according to actual needs. It is evident that such arrangement enables the mobile terminal applying the antenna system 100 to realize 4G and 5G mobile communications at the same time.

As shown in FIG. 1, the housing 200 has a major-axis direction and a minor-axis direction. The housing 200 includes a bottom wall 210 and a side wall 220 bending and extending from the bottom wall 210. The side wall 220 includes two first side walls 221 oppositely spaced apart from each other along the major-axis direction and two second side walls 222 oppositely spaced apart from each other along the minor-axis direction.

As shown in FIG. 1, each of the first antennas 111 is arranged at a juncture of the bottom wall 210 and the first side walls 221. Each of the second antennas 121 is arranged at a juncture of the bottom wall 210 and the second side walls 222. Some of the third antennas 131 are arranged on the bottom wall 210, and other third antennas 131 are arranged at the juncture of the bottom wall 210 and the second side walls 222.

According to the antenna system 100 of the embodiment, using the above-mentioned layout of the antennas in the first antenna group 110, the second antenna group 120 and the third antenna group 130 on the housing 200 can greatly improve the utilization rate of the housing, so that the antenna system 100 is more compact on the housing 200, and mutual signal interference is avoided, thus further improving the signal transmission rate of the mobile terminal applying the antenna system 100.

Specifically, as shown in FIG. 1, the first antenna group 110 includes three first antennas 111, where one of the first antennas 111 is arranged at the juncture of the bottom wall 210 and one of the first side walls 221 (the first side wall 221 at the bottom as shown in FIG. 1), and the other two first antennas 111 are arranged at the juncture of the bottom ball 210 and the other one of the first side walls 221 (the first side wall 221 at the top shown in FIG. 1). And more preferably, the first antennas 111 located on the first side wall 221 at the bottom may be distributed in a middle region of the first side wall 221, and the two first antennas 111 located on the first side wall 221 at the top may be distributed in an edge region of the first side wall 221.

As shown in FIG. 1, the second antenna group 120 includes four second antennas 121 symmetrically arranged, and the four second antennas 121 may form a 4*4 MIMO system.

As shown in FIG. 1, the third antenna group 130 includes four third antenna subgroups 132, and each of the third antenna subgroups 132 includes four third antennas 131 arranged in an array.

Specifically, as shown in FIG. 1, all the third antennas 131 in two of the third antenna subgroups 132 are arranged in a 2*2 array, and all the third antennas 131 in the other two third antenna subgroups 132 are arranged in a 1*4 array.

More specifically, the third antenna subgroups 132 arranged in the 2*2 array are located on the bottom wall 210, and the third antenna subgroups 132 arranged in the 1*4 array are located at the juncture of the bottom wall 210 and the second side walls 222.

A second aspect of the present disclosure provides a mobile terminal, including a housing 200 and an antenna system 100 arranged on the housing, where the antenna system 100 described above is used as the antenna system 100 in the second aspect of the present disclosure. Preferably, the housing 200 may be a 3D glass housing.

The mobile terminal provided in the embodiment has the antenna system 100 described above, and includes a first antenna group 110, a second antenna group 120 and a third antenna group 130 distributed on a housing 200. The first antenna group 110 includes a plurality of first antennas 111, the second antenna group 120 includes a plurality of second antennas 121, and the third antenna group 130 includes a plurality of third antennas 131. Moreover, the first antennas 111, the second antennas 121 and the third antennas 131 operate at different bands. In this way, the operating bands of the antennas in each antenna group may be determined according to actual needs. For example, the first antennas 111 may operate at a 4G band, the second antennas 121 may operate at a Sub 6G band, and the third antennas 131 may operate at a 5G millimeter-wave band. Moreover, a MIMO system can be formed in at least one of the antenna groups. It is evident that such arrangement enables the mobile terminal applying the antenna system to realize 4G and 5G mobile communications at the same time, and have multiple signal transmission modes and improve the signal transmission efficiency.

The description above is merely embodiments of the present disclosure, and it should be pointed out that, those of ordinary skills in the art can make improvements without departing from the inventive concept of the present disclosure, but these all belong to the scope of protection of the present disclosure.

What is claimed is:

1. An antenna system for a mobile terminal, comprising a first antenna group, a second antenna group and a third antenna group, wherein the first antenna group comprises a plurality of first antennas, the second antenna group comprises a plurality of second antennas, the third antenna group comprises a plurality of third antennas, the first antenna operates at a 4G band, the second antenna operates at a Sub 6G band, and the third antenna operates at a 5G millimeter-wave band;

wherein the mobile terminal comprises a housing having a major-axis direction and a minor-axis direction, the housing comprises a bottom wall and a side wall bending and extending from the bottom wall, the side wall comprises two first side walls oppositely spaced apart from each other along the major-axis direction and two second side walls oppositely spaced apart from each other along the minor-axis direction;

each of the first antennas is arranged at a juncture of the bottom wall and the first side walls;

each of the second antennas is arranged at a juncture of the bottom wall and the second side walls; and some of the third antennas are arranged on the bottom wall, and other third antennas are arranged at the juncture of the bottom wall and the second side walls.

2. The antenna system according to claim 1, wherein the second antenna group comprises four second antennas and forms a 4*4 MIMO (multiple input multiple output) system.

3. The antenna system according to claim 1, wherein the first antenna group comprises three first antennas, one of the first antennas is arranged at the juncture of the bottom wall and one of the first side walls, and the other two first antennas are arranged at the juncture of the bottom ball and the other one of the first side walls.

4. The antenna system according to claim 1, wherein the second antenna group comprises four second antennas symmetrically arranged.

5. The antenna system according to claim 1, wherein the third antenna group comprises four third antenna subgroups, and each of the third antenna subgroups comprises four third antennas arranged in an array.

6. The antenna system according to claim 5, wherein all the third antennas in two of the third antenna subgroups are arranged in a 2*2 array, and all the third antennas in the other two third antenna subgroups are arranged in a 1*4 array.

7. The antenna system according to claim 6, wherein the third antenna subgroups arranged in the 2*2 array are located on the bottom wall, and the third antenna subgroups arranged in the 1*4 array are located at the juncture of the bottom wall and the second side walls.

8. A mobile terminal, comprising a housing and an antenna system arranged on the housing, wherein the antenna system comprises a first antenna group, a second antenna group and a third antenna group, wherein the first antenna group comprises a plurality of first antennas, the second antenna group comprises a plurality of second antennas, the third antenna group comprises a plurality of third antennas, the first antenna operates at a 4G band, the second antenna operates at a Sub 6G band, and the third antenna operates at a 5G millimeter-wave band;

wherein the housing has a major-axis direction and a minor-axis direction, the housing comprises a bottom wall and a side wall bending and extending from the bottom wall, the side wall comprises two first side walls oppositely spaced apart from each other along the major-axis direction and two second side walls oppositely spaced apart from each other along the minor-axis direction;

each of the first antennas is arranged at a juncture of the bottom wall and the first side walls;

each of the second antennas is arranged at a juncture of the bottom wall and the second side walls; and some of the third antennas are arranged on the bottom wall, and other third antennas are arranged at the juncture of the bottom wall and the second side walls.

9. The mobile terminal according to claim 8, wherein the second antenna group comprises four second antennas and forms a 4*4 MIMO (multiple input multiple output) system.

10. The mobile terminal according to claim 8, wherein the first antenna group comprises three first antennas, one of the first antennas is arranged at the juncture of the bottom wall and one of the first side walls, and the other two first antennas are arranged at the juncture of the bottom ball and the other one of the first side walls.

11. The mobile terminal according to claim 8, wherein the second antenna group comprises four second antennas symmetrically arranged.

12. The mobile terminal according to claim 8, wherein the third antenna group comprises four third antenna subgroups, and each of the third antenna subgroups comprises four third antennas arranged in an array.

13. The mobile terminal according to claim 12, wherein all the third antennas in two of the third antenna subgroups are arranged in a 2*2 array, and all the third antennas in the other two third antenna subgroups are arranged in a 1*4 array.

14. The mobile terminal according to claim 13, wherein the third antenna subgroups arranged in the 2*2 array are located on the bottom wall, and the third antenna subgroups arranged in the 1*4 array are located at the juncture of the bottom wall and the second side walls.

* * * * *